US012530261B2

(12) United States Patent
Ayyapureddi et al.

(10) Patent No.: US 12,530,261 B2
(45) Date of Patent: Jan. 20, 2026

(54) APPARATUSES, SYSTEMS, AND METHODS FOR STORING AND ACCESSING MEMORY METADATA AND ERROR CORRECTION CODE DATA

(71) Applicant: Micron Technology, Inc., Boise, ID (US)

(72) Inventors: Sujeet Ayyapureddi, Boise, ID (US); Scott E. Smith, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/441,830

(22) Filed: Feb. 14, 2024

(65) Prior Publication Data

US 2024/0281327 A1  Aug. 22, 2024

Related U.S. Application Data

(60) Provisional application No. 63/486,077, filed on Feb. 21, 2023.

(51) Int. Cl.
G06F 11/10 (2006.01)
G06F 11/14 (2006.01)
G06F 13/16 (2006.01)

(52) U.S. Cl.
CPC ...... *G06F 11/1068* (2013.01); *G06F 11/1435* (2013.01); *G06F 13/1673* (2013.01)

(58) Field of Classification Search
None
See application file for complete search history.

(56) References Cited

U.S. PATENT DOCUMENTS

| | | |
|---|---|---|
| 5,434,814 A | 7/1995 | Cho et al. |
| 6,249,476 B1 | 6/2001 | Yamazaki et al. |
| 7,117,421 B1 | 10/2006 | Danilak |
| 9,158,617 B2 | 10/2015 | Cho et al. |
| 9,201,728 B2 | 12/2015 | Patapoutian et al. |
| 9,361,960 B2 | 6/2016 | Vogelsang |
| 9,547,550 B1 | 1/2017 | Thakore et al. |
| 9,607,679 B1 | 3/2017 | Kim et al. |
| 9,666,291 B2 | 5/2017 | Park |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

U.S. Appl. No. 18/424,282 titled "Apparatuses and Methods for Bounded Fault Compliant Metadata Storage", filed Jan. 26, 2024; pp. all pages of application as filed.

(Continued)

*Primary Examiner* — Daniel F. McMahon
(74) *Attorney, Agent, or Firm* — Dorsey & Whitney LLP

(57) ABSTRACT

A bank of a memory device is divided into column planes. Each column plane is associated with column selects. A portion of a column plane associated with one column select used to store metadata associated with data of the remaining column selects. Both the metadata and the data are provided to an error correction code circuit as a combined code word that provides error correction for both the data and the metadata.

20 Claims, 6 Drawing Sheets

(56) References Cited

U.S. PATENT DOCUMENTS

| | | |
|---|---|---|
| 9,880,901 B2 | 1/2018 | Zastrow |
| 9,996,799 B2 | 6/2018 | Bostick et al. |
| 10,127,101 B2 | 11/2018 | Halbert et al. |
| 10,222,989 B1 | 3/2019 | Zitlaw |
| 10,243,590 B1 | 3/2019 | Seshadri |
| 10,810,079 B2 | 10/2020 | Halbert et al. |
| 10,817,371 B2 | 10/2020 | Rooney et al. |
| 10,872,011 B2 | 12/2020 | Bains et al. |
| 10,929,033 B2 | 2/2021 | Meeker et al. |
| 10,937,517 B1 | 3/2021 | Rich-Plotkin et al. |
| 11,010,304 B2 | 5/2021 | Kang et al. |
| 11,074,126 B2 | 7/2021 | Prather et al. |
| 11,088,710 B2 | 8/2021 | Lee et al. |
| 11,200,961 B1 | 12/2021 | Uribe |
| 11,264,085 B1 | 3/2022 | Ware et al. |
| 11,538,515 B2 | 12/2022 | Ji et al. |
| 11,579,971 B2 | 2/2023 | Ayyapureddi |
| 11,580,038 B2 | 2/2023 | Norman et al. |
| 11,615,861 B2 | 3/2023 | Kim et al. |
| 12,001,707 B2 | 6/2024 | Boehm et al. |
| 12,014,797 B2 | 6/2024 | Ayyapureddi |
| 12,019,513 B2 | 6/2024 | Ayyapureddi |
| 12,204,410 B2 | 1/2025 | Sutera et al. |
| 12,204,770 B2 | 1/2025 | Ayyapureddi |
| 12,230,347 B2 | 2/2025 | Suh et al. |
| 12,249,393 B2 | 3/2025 | Reohr |
| 2003/0081492 A1 | 5/2003 | Farrell et al. |
| 2006/0233030 A1 | 10/2006 | Choi |
| 2008/0089129 A1 | 4/2008 | Lee |
| 2008/0313493 A1 | 12/2008 | Roohparvar et al. |
| 2009/0097348 A1 | 4/2009 | Minzoni et al. |
| 2009/0132876 A1 | 5/2009 | Freking et al. |
| 2009/0168523 A1 | 7/2009 | Shirakawa et al. |
| 2009/0196103 A1 | 8/2009 | Kim et al. |
| 2010/0177582 A1 | 7/2010 | Kim et al. |
| 2010/0177587 A1 | 7/2010 | Huang |
| 2010/0290146 A1 | 11/2010 | Lam |
| 2011/0154158 A1 | 6/2011 | Yurzola et al. |
| 2013/0117630 A1 | 5/2013 | Kang |
| 2014/0126300 A1 | 5/2014 | Takahashi et al. |
| 2015/0193464 A1 | 7/2015 | Kwon et al. |
| 2015/0262631 A1 | 9/2015 | Shimizu |
| 2016/0070507 A1 | 3/2016 | Hoshikawa et al. |
| 2016/0092307 A1 | 3/2016 | Bonen et al. |
| 2016/0125920 A1 | 5/2016 | Kim et al. |
| 2016/0307645 A1 | 10/2016 | Kim et al. |
| 2017/0060681 A1 | 3/2017 | Halbert et al. |
| 2017/0062067 A1 | 3/2017 | Yang et al. |
| 2017/0091025 A1 | 3/2017 | Ahn et al. |
| 2017/0192843 A1 | 7/2017 | Warnes et al. |
| 2017/0249097 A1 | 8/2017 | Eguchi |
| 2017/0269992 A1 | 9/2017 | Bandic et al. |
| 2017/0285990 A1 | 10/2017 | Chen et al. |
| 2017/0286213 A1 | 10/2017 | Li |
| 2017/0344423 A1 | 11/2017 | Hsiao et al. |
| 2018/0025760 A1 | 1/2018 | Mazumder et al. |
| 2018/0121283 A1 | 5/2018 | Plants |
| 2018/0150350 A1 | 5/2018 | Cha et al. |
| 2019/0066816 A1 | 2/2019 | Dono |
| 2019/0073261 A1 | 3/2019 | Halbert et al. |
| 2019/0103154 A1 | 4/2019 | Cox et al. |
| 2019/0197171 A1 | 6/2019 | Tiwari et al. |
| 2019/0206478 A1 | 7/2019 | Jun |
| 2019/0362792 A1 | 11/2019 | Oh et al. |
| 2019/0369893 A1 | 12/2019 | Ross |
| 2020/0019462 A1 | 1/2020 | Prather et al. |
| 2020/0051616 A1 | 2/2020 | Cho |
| 2020/0104205 A1 | 4/2020 | Noguchi et al. |
| 2020/0104208 A1* | 4/2020 | Heo ................ G06F 3/0619 |
| 2020/0194050 A1 | 6/2020 | Akamatsu |
| 2020/0226039 A1 | 7/2020 | Lee |
| 2020/0373941 A1 | 11/2020 | Latorre et al. |
| 2021/0011645 A1 | 1/2021 | Martinelli et al. |
| 2021/0012817 A1 | 1/2021 | Laurent et al. |
| 2021/0012849 A1 | 1/2021 | Kim et al. |
| 2021/0057003 A1 | 2/2021 | Prather et al. |
| 2021/0064119 A1 | 3/2021 | Mirichigni et al. |
| 2021/0064282 A1 | 3/2021 | He et al. |
| 2021/0064461 A1 | 3/2021 | Veches |
| 2021/0064467 A1 | 3/2021 | Buerkle et al. |
| 2021/0083687 A1 | 3/2021 | Lee et al. |
| 2021/0142848 A1 | 5/2021 | Lim et al. |
| 2021/0142860 A1 | 5/2021 | Song et al. |
| 2021/0200630 A1 | 7/2021 | Ishikawa et al. |
| 2021/0208967 A1* | 7/2021 | Cha ................ H03M 13/13 |
| 2021/0224155 A1 | 7/2021 | Bains et al. |
| 2021/0247910 A1 | 8/2021 | Kim et al. |
| 2021/0272627 A1 | 9/2021 | Lee |
| 2021/0294692 A1 | 9/2021 | Chen |
| 2021/0311821 A1 | 10/2021 | Ryu et al. |
| 2021/0311822 A1 | 10/2021 | Jannusch et al. |
| 2021/0311830 A1 | 10/2021 | Lee |
| 2021/0357287 A1* | 11/2021 | Kim ............ H03M 13/1575 |
| 2021/0358559 A1* | 11/2021 | Suh ............... G06F 11/1048 |
| 2021/0365316 A1 | 11/2021 | Nale et al. |
| 2021/0406123 A1 | 12/2021 | Nakanishi et al. |
| 2022/0027090 A1 | 1/2022 | Kwon et al. |
| 2022/0035529 A1 | 2/2022 | Bennett |
| 2022/0084565 A1 | 3/2022 | Prather et al. |
| 2022/0091938 A1 | 3/2022 | Buerkle et al. |
| 2022/0129196 A1 | 4/2022 | Roberts et al. |
| 2022/0138065 A1 | 5/2022 | Secatch et al. |
| 2022/0197739 A1 | 6/2022 | Ryu et al. |
| 2022/0261310 A1 | 8/2022 | Ishikawa et al. |
| 2022/0334917 A1 | 10/2022 | Veches |
| 2022/0337271 A1 | 10/2022 | Hanna |
| 2022/0365692 A1 | 11/2022 | Vankamamidi et al. |
| 2022/0398042 A1 | 12/2022 | Song et al. |
| 2022/0415398 A1 | 12/2022 | Lien et al. |
| 2023/0146549 A1 | 5/2023 | Lien et al. |
| 2023/0161665 A1 | 5/2023 | Choi et al. |
| 2023/0185665 A1 | 6/2023 | Ayyapureddi |
| 2023/0223096 A1* | 7/2023 | Bains ................ G11C 29/028 365/185.09 |
| 2023/0289072 A1 | 9/2023 | Cho et al. |
| 2023/0298682 A1 | 9/2023 | Suh et al. |
| 2023/0350581 A1 | 11/2023 | Ayyapureddi |
| 2023/0350748 A1 | 11/2023 | Ayyapureddi |
| 2023/0352064 A1 | 11/2023 | Ayyapureddi |
| 2023/0352112 A1 | 11/2023 | Ayyapureddi |
| 2024/0079074 A1 | 3/2024 | Bak et al. |
| 2024/0086520 A1 | 3/2024 | Kaplan et al. |
| 2024/0096404 A1 | 3/2024 | Cho et al. |
| 2024/0126438 A1 | 4/2024 | Suh et al. |
| 2024/0160351 A1 | 5/2024 | Ayyapureddi et al. |
| 2024/0160524 A1 | 5/2024 | Ayyapureddi et al. |
| 2024/0160527 A1 | 5/2024 | Ayyapureddi et al. |
| 2024/0161855 A1 | 5/2024 | Smith et al. |
| 2024/0161856 A1 | 5/2024 | Smith et al. |
| 2024/0161859 A1 | 5/2024 | Ayyapureddi et al. |
| 2024/0170088 A1 | 5/2024 | Smith et al. |
| 2024/0176699 A1 | 5/2024 | Ayyapureddi et al. |
| 2024/0177794 A1* | 5/2024 | Vogelsang ............. G11C 29/52 |
| 2024/0220149 A1 | 7/2024 | Kim et al. |
| 2024/0248796 A1 | 7/2024 | Ayyapureddi |
| 2024/0256380 A1 | 8/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0289266 A1 | 8/2024 | Ayyapureddi |
| 2024/0321328 A1 | 9/2024 | Ayyapureddi |
| 2024/0377952 A1* | 11/2024 | Song .................. G06F 3/0634 |
| 2024/0394178 A1 | 11/2024 | Partsch |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1* | 3/2025 | Kim .................. G11C 11/4087 |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0110830 A1 | 4/2025 | Ayyapureddi |

(56) References Cited

U.S. PATENT DOCUMENTS

| | | |
|---|---|---|
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | | |
|---|---|---|---|
| WO | 2024107503 A1 | 5/2024 | |
| WO | 2024107504 A1 | 5/2024 | |
| WO | 2024167711 A1 | 8/2024 | |
| WO | 2025053912 A1 | 3/2025 | |
| WO | 2025075696 A1 | 4/2025 | |
| WO | 2025075697 A1 | 4/2025 | |

OTHER PUBLICATIONS

U.S. Appl. No. 18/424,342 titled "Apparatuses and Methods for Bounded Fault Compliant Metadata Storage", filed Jan. 26, 2024; pp. all pages of application as filed.

U.S. Appl. No. 18/430,381, titled "Apparatuses, Systems, and Methods for Storing Memory Metadata", filed Feb. 1, 2024; pp. all pages of application as filed.

U.S. Appl. No. 18/430,406, titled "Apparatuses, Systems, and Methods for Storing Memory Metadata", filed Feb. 1, 2024; pp. all pages of application as filed.

U.S. Appl. No. 18/431,232, titled "Apparatuses, Systems, and Methods for Storing Memory Metadata", filed Feb. 2, 2024; pp. all pages of application as filed.

U.S. Appl. No. 18/431,306, titled "Apparatuses, Systems, and Methods for Storing Memory Metadata", filed Feb. 2, 2024; pp. all pages of application as filed.

U.S. Appl. No. 18/504,215 titled "Apparatuses and Methods for Enhanced Metadata Support", filed Nov. 8, 2023; pp. all pages of application as filed.

U.S. Appl. No. 18/504,234 titled "Apparatuses and Methods for Enhanced Metadata Support", filed Nov. 8, 2023; pp. all pages of application as filed.

U.S. Appl. No. 18/504,302 titled "Apparatuses and Methods for Configurable Ecc Modes", filed Nov. 8, 2023; pp. all pages of application as filed.

U.S. Appl. No. 18/504,316 titled "Apparatuses and Methods for Configurable ECC Modes", filed Nov. 8, 2023; all pages of application as filed.

U.S. Appl. No. 18/504,324 titled "Apparatuses and Methods for Single-Pass Access of ECC Information, Metadata Information or Combinations Thereof", filed Nov. 8, 2023, all pages of application as filed.

U.S. Appl. No. 18/504,342 titled "Apparatuses and Methods for Single-Pass Access of ECC Information,Metadata Information or Combinations Thereof", filed Nov. 8, 2023; pp. all pages of application as filed.

U.S. Appl. No. 18/504,353 titled "Apparatuses and Methods for Separate Write Enable for Single-Pass Accessof Data, Metadata, and Parity Information", filed Nov. 8, 2023; pp. all pages of application as filed.

U.S. Appl. No. 18/504,362 titled "Apparatuses and Methods for Separate Write Enable for Single-Pass Access of Data, Metadata, and Parity Information", filed Nov. 8, 2023; pp. all pages of application as filed.

U.S. Appl. No. 19/025,934, titled "Apparatuses, Systems, and Methods for Managing Metadata Security and Access", filed Jan. 16, 2025, pp. all pages of application as filed.

U.S. Appl. No. 18/625,539, titled "Apparatuses, Systems, and Methods for Per Row Error Scrub Information", filed Apr. 3, 2024, pp. all pages of application as filed.

Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.

J. F. Philippe Marchand "An Alterable Programmable Logic Array"; IEEE Journal of Solid-State Circuits, vol. sc-20, No. 5, Oct. 1985; pp. 1061-1066.

U.S. Appl. No. 18/441,775 titled "Apparatuses and Methods for Settings for Adjustable Write Timing", filed Feb. 14, 2024, pp. all pages of the application as filed.

U.S. Appl. No. 18/734, 189, titled "Apparatuses, Systems, and Methods for Managing Metadata Storage At a Memory", filed Jun. 5, 2024, pp. all pages of application as filed.

U.S. Appl. No. 18/743,994 titled "Apparatuses and Methods for Shared Codeword in 2-PASS Access Operations", filed Jun. 14, 2024, pp. all pages of the application as filed.

U.S. Appl. No. 18/745,577 titled "Apparatuses and Methods for Half-Page Modes of Memory Devices", filed Jun. 17, 2024, pp. all pages of the application as filed.

U.S. Appl. No. 18/745,843 titled "Apparatuses and Methods for Half-Page Modes of Memory Devices", filed Jun. 17, 2024, pp. all pages of the application as filed.

U.S. Appl. No. 18/745,877 titled "Apparatuses and Methods for Half-Page Modes of Memory Devices", filed Jun. 17, 2024, pp. all pages of the application as filed.

U.S. Appl. No. 18/745,894 titled "Apparatuses and Methods for Half-Page Modes of Memory Devices", filed Jun. 17, 2024, pp. all pages of the application as filed.

U.S. Appl. No. 18/747,658, titled "Apparatuses and Methods for Bounded Fault Compliant Metadata Storage" filed, pp. all pages of application as filed.

U.S. Appl. No. 18/747,676, titled "Apparatuses and Methods for Alternate Memory Die Metadata Storage", filed Jun. 19, 2024, pp. all pages of application as filed.

U.S. Appl. No. 18/747,696, titled "Apparatuses and Methods for Scalable 1-PASS Error Correction Code Operations", filed Jun. 19, 2024, pp. all pages of application as filed.

U.S. Appl. No. 18/747,712, titled "Apparatuses and Methods for Granular Single-Pass Metadata Access Operations", filed Jun. 19, 2024, pp. all pages of application as filed.

U.S. Appl. No. 18/747,635, titled "Apparatuses and Methods for Read/Modify/Write Single-Pass Metadata Access Operations", filed Jun. 19, 2024, pp. all pages of application as filed.

PCT Application No. PCT/US24/39192 titled "Apparatuses and Methods for Scalable 1-Pass Error Correction Code Operations" filed Jul. 23, 2024, pp. all pages of the application as filed.

PCT Application No. PCT/US24/39195 titled "Apparatuses and Methods for Half-Page Modes of Memory Devices" filed Jul. 23, 2024, pp. all pages of the application as filed.

PCT Application No. PCT/US24/39231 titled "Apparatuses and Methods for Granular Single-Pass Metadata Access Operations" filed Jul. 24, 2024, pp. all pages of the application as filed.

Lumenci Team "High Bandwidth Memory (HBM3)" https://lumenci.com/blogs/high-bandwidth-memory; Editorial Team at Lumenci, Jul. 14, 2022; pp. 1-3.

U.S. Appl. No. 19/360,159 titled "Apparatuses and Methods for Enhanced Metadata Support" filed Oct. 16, 2025; pp. all pages of the application as filed.

U.S. Appl. No. 19/366,908 titled "Apparatuses and Methods for Configurable ECC Modes", filed Oct. 23, 2025; pp. all pages of application as filed.

U.S. Appl. No. 19/376,027 titled "Apparatuses and Methods for Single-Pass Access of ECC Information, Metadata Information or Combinations Thereof", filed Oct. 31, 2025; pp. all pages of application as filed.

U.S. Appl. No. 19/381,448 titled "Apparatuses and Methods for Enhanced Metadata Support", filed Nov. 6, 2025; pp. all pages of application as filed.

* cited by examiner

APPARATUSES, SYSTEMS, AND METHODS FOR STORING AND ACCESSING MEMORY METADATA AND ERROR CORRECTION CODE DATA

CROSS-REFERENCE TO RELATED APPLICATIONS

This application claims the filing benefit of U.S. Provisional Application No. 63/486,077, filed Feb. 21, 2023. This application is incorporated by reference herein in its entirety and for all purposes.

BACKGROUND

This disclosure relates generally to semiconductor devices, and more specifically to semiconductor memory devices. In particular, the disclosure relates to memory, such as dynamic random access memory (DRAM). Information may be stored in memory cells, which may be organized into rows (word lines) and columns (bit lines) of an array. Various types of information may be stored in the array, such as data, error correction code (ECC) data, and metadata. The ECC data may provide information that may be used to detect and/or correct errors in the data. For example, the ECC data may include parity bits that may allow for single error correction (SEC) of the associated data. The metadata may provide information about the regular data, ECC data, the memory device, and/or a device in communication with the memory device (e.g., a controller).

As use of metadata increases, techniques for accessing data and metadata stored in the memory are desired.

DETAILED DESCRIPTION

Figure 1:
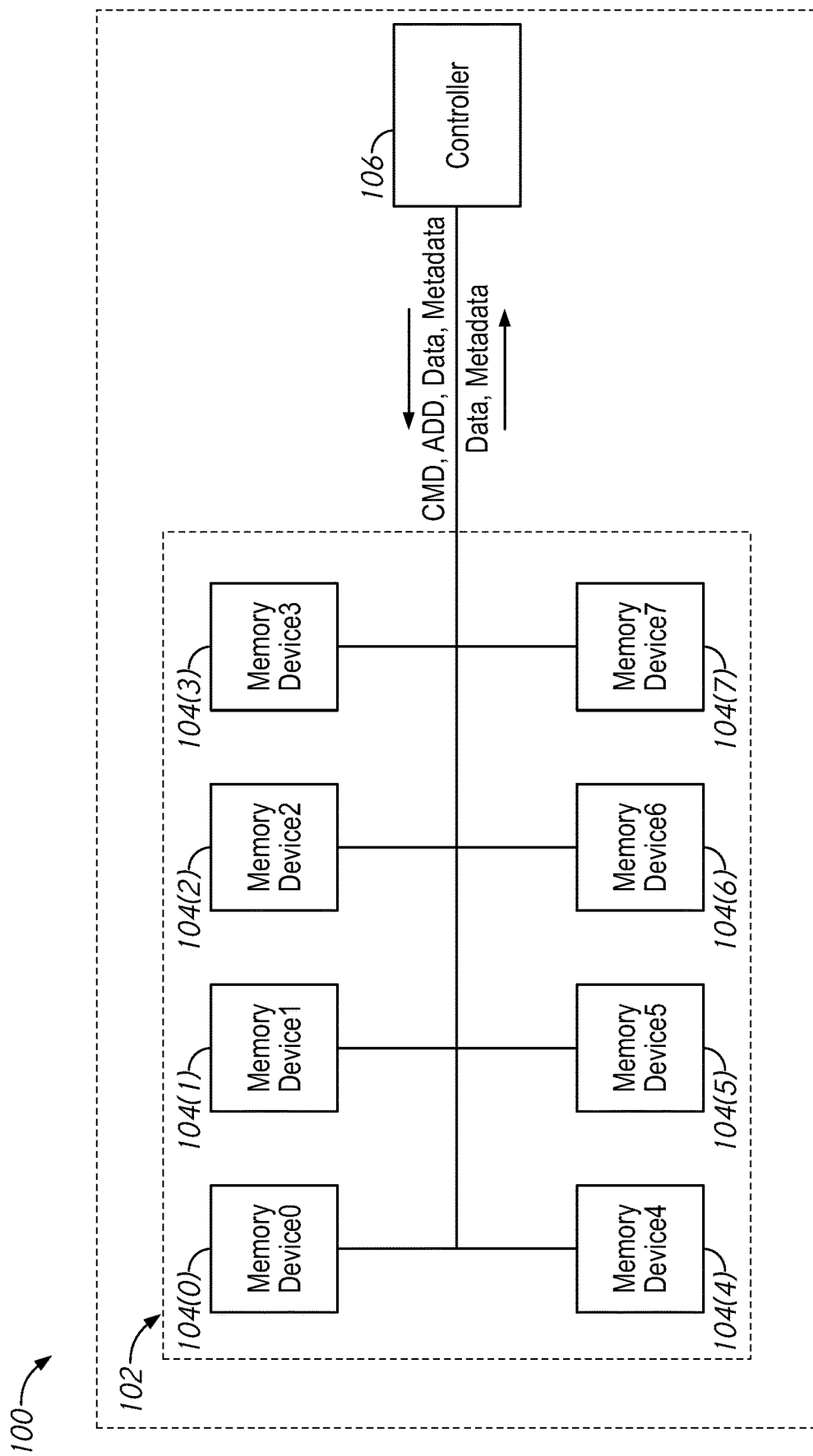
FIG. 1 is a block diagram of at least a portion of a computing system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Semiconductor memory devices may store information in multiple memory cells. The information may be stored as a binary code, and each memory cell may store a single bit of information as either a logical high (e.g., a "1") or a logical low (e.g., a "0"). The memory cells may be organized at the intersection of word lines (rows) and bit lines (columns) an array. The memory may further be organized into one or more memory banks. The banks may be organized into bank groups, where each bank group includes one or more banks. Each bank may include multiple of rows and columns. During operations, the memory device may receive a command and an address which specifies one or more rows and one or more columns and then execute the command on the memory cells at the intersection of the specified rows and columns (and/or along an entire row/column). The address may further specify the bank group and/or bank for execution of the command. In some applications, rows may be specified by 17-bit row addresses and columns may be specified by 10-bit column addresses. However, the number of bits used for the addresses may vary depending on the size and/or organization of the memory.

The columns of a bank may generally be organized into column planes, each of which includes a number of sets of individual columns all activated by a column select signal (a column select signal may also be referred to as a "column select"). Each bank may include some number X column planes. A column plane may receive some number N of column select (CS) signals, each of which may activate some number M of individual bit lines. As used herein, a column select set or CS set may generally refer to a set of bit lines which are activated by a given value of the CS signal within a column plane. The column select signal may be represented by (all or a portion of) a column address (CA). Responsive to a column select signal, data may be provided from corresponding locations from the column planes. The data from the column planes associated with the column select signal may be referred to as a cache line.

In some embodiments, each bank of a memory array may include seventeen (X=17) column planes. In some embodiments, sixteen (16) column planes may be designated for data and one column plane may be designated for ECC data. Each column plane may receive sixty-four (N=64) CS signals, each of which may activate eight (M=8) bit lines. When a column select is activated, each column plane may provide eight bits, resulting in a prefetch of 128 bits of data (e.g., 8 bits×16 column planes) and 8 bits of ECC data (e.g., 8 bits×1 column plane). Optionally, in some embodiments, one or more banks may include an additional column plane (X=18) for redundancy, which may be used for repairs, but the bits from the redundant column plane "replace" the bits from a damaged column plane, resulting in a same prefetch.

During a read operation, data and ECC data may be retrieved from the memory array and provided to an ECC circuit. In some embodiments, the data and ECC data may be a code word provided to the ECC circuit. The ECC circuit may determine whether or not there is an error in the code word (e.g., based on parity bits of the ECC data). If an error is detected, the ECC circuit may correct the error and output the corrected data. During a write operation, the ECC circuit may receive data and generate a corresponding code word including the data and the ECC data. The data and ECC data may then be written to the appropriate column planes of the memory array.

DRAM users are increasingly utilizing metadata to supplement the data stored in the memory array. For example, metadata may be used to store a "poison bit" that indicates that the data associated with the metadata is erroneous and should be discarded and/or replaced by an external device (e.g., controller, host, and/or system on a chip). In another example, metadata may store a pointer to a storage location that may allow the external device to determine what location in the array to access the next associated data. In some applications, this may be analogous to a head and/or tail of a linked list. These are merely examples, and other uses of metadata are also possible.

Typically, the number of bits of metadata is less than the number of data bits of a prefetch. For example, one to 32 bits of metadata may be associated with a prefetch of 128 bits of data. The amount of metadata may be based, at least in part, on an operating mode of a memory device. For example, a memory module may include one or more die operating in ×8 mode may provide 8 bits of metadata. Each die on the memory module may provide 8 bits of metadata and 128 bits of data.

Metadata may be stored in various locations in the memory device, including the memory array. In addition to protecting data, it may be desirable to protect the metadata with ECC data. However, in some applications, generating a code word for the metadata would require retrieving all of the metadata even though only a portion of the bits were necessary. For example, there may be eight bits of metadata for each column plane and 128 total metadata bits for 16 column planes. Thus, even though only eight bits of metadata need to be provided with the data, all 128 bits would be required to be retrieved along with ECC data to provide a code word to the ECC circuit. This causes more columns to be fired than necessary during an access operation. Furthermore, such an operation may be required to be a read-modify-write operation, which incurs a significant time penalty. Accordingly, avoiding a RMW operation when accessing the metadata while still protecting the metadata with ECC data may be desired.

According to embodiments of the present disclosure, metadata and data may be combined in a single code word provided to the memory. In some embodiments, data, metadata, and ECC data may be accessed in a two-pass operation. For example, during a read operation, in a first pass, metadata may be retrieved from the memory array and stored in local buffers (e.g., latches/flip-flops) of the memory bank. In a second pass, the data and ECC data may be retrieved from the memory array. The data, ECC data, and metadata may then be provided to the ECC circuit as a single code word. In other words, the ECC data may include parity bits related to both the metadata and the data. Typically, eight bits of ECC data are used to provide single error detection and correction for 128 bits of data. However, eight bits of ECC data can be used to provide single error detection and correction for up to 256 bits. The 256 bits also include the 8 ECC bits. Accordingly, providing protection of metadata may not require additional bits of ECC data in some embodiments.

During a write operation, the data and metadata may be provided to the ECC circuit, and the ECC circuit may generate the ECC data. The data and ECC data may be provided to the memory array in a first pass and the metadata may be provided to the memory array in a second pass. While the order may be reversed, by accessing the metadata first during read operations and last during write operations, the size and/or number of buffers required may be less as there is typically fewer bits of metadata than data.

In some embodiments, portions of individual column planes may be used to store metadata. In some embodiments, one of the column select signals may be used to access metadata stored in the portions of the column planes. In some embodiments, one or more column selects of one or more column planes may be associated with the metadata. For example, one or more column selects in one or more of the column planes for storing data may be associated with metadata, and metadata may be stored in memory cells associated with the metadata column selects. In some embodiments, when there are 16 column planes for data, each with 64 column selects, and eight bits of metadata are associated with each cache length or prefetch, four column selects may be used to access metadata. For example, column selects 0-59 may be used to access data in each column plane and column selects 60-63 may be used to access metadata. In embodiments where sixteen metadata bits for each cache length ore prefetch is desired, column selects 0-55 may be used to access data and column selects 56-53 may be used to access metadata.

FIG. 1 is a block diagram of at least a portion of a computing system according to some embodiments of the present disclosure. The computing system 100 includes a memory module 102 and a controller 106 in communication with the memory module 102. In some embodiments, the controller 106 may be included in a processor (not shown) or in communication with the processor. The memory module 102 may include one or more memory devices 104. In the example shown in FIG. 1, there are eight memory devices 104(0-7). However, in other embodiments, there may be more or fewer memory devices. In some embodiments, additional memory devices 104 may be included to provide for redundancy. In some embodiments, memory module 102 may be a dual in-line memory module (DIMM). In some embodiments, what is shown in FIG. 1 may represent only half of the DIMM (e.g., one of the two channels).

The controller 106 may provide commands, addresses, and/or data (e.g., data, metadata, or both) to one or more of the memory devices 104 and receive data from one or more of the memory devices 104. In some embodiments, memory devices 104 may be ×4 or ×8 memory devices. That is, either four or eight DQ terminals (e.g., pins) may be active. In some embodiments, the memory devices 104 may support both ×4 and ×8 operation. In some embodiments, whether the memory devices 104 operate in ×4 or ×8 mode may be based, at least in part, on values stored in mode registers (not shown in FIG. 1) of the memory devices 104.

In some embodiments, the memory devices 104 may be configured to operate in ×8 mode. In some embodiments, four of the memory devices (e.g., memory devices 104(0-3) or memory devices 104(4-7)) may provide data and/or metadata responsive to the controller 106 for a single access operation. In some embodiments, the memory module 102 may include four of the memory devices 104 configured to operate in ×8 mode, and the remaining memory devices 104 may be omitted. In ×8 mode, each memory device 104 may provide 128 bits of data response to a read command from the controller 106. Each memory device 104 may write 128 bits to a memory array (not shown in FIG. 1) included in each memory device 104 responsive to a write command from the controller 106. In some embodiments, each memory device may further provide 8 or 16 bits of metadata responsive to a read command and/or write 8 or 16 bits of metadata to the memory array responsive to a write command. Thus, either a total of four or eight bytes of metadata may be associated with the data provided to or received from the controller 106 responsive to an access command in some embodiments. In some embodiments, the controller 106 may program a mode register to determine whether 8 or 16 bits of metadata are provided or received by each memory device 104.

Figure 2:
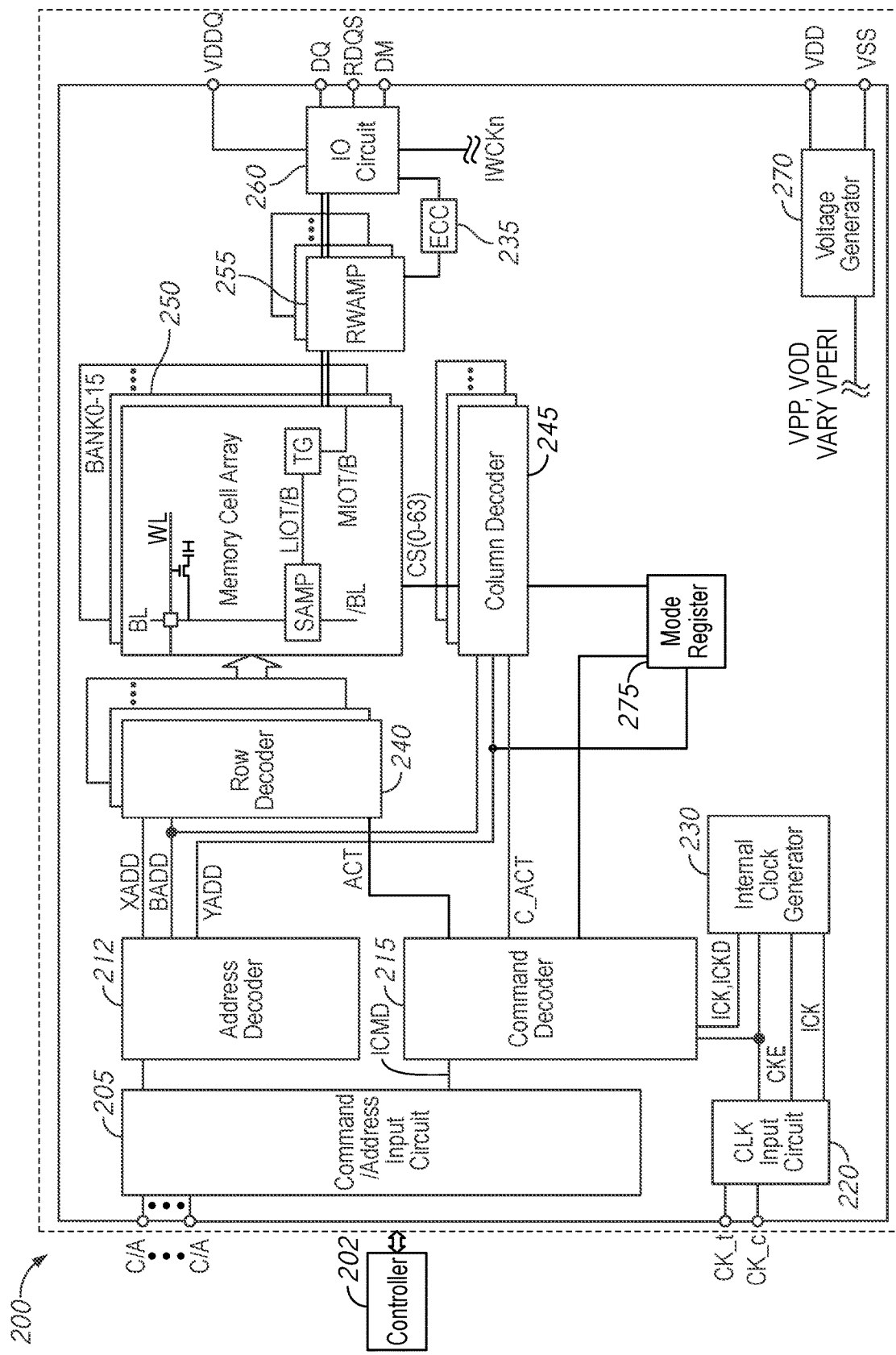
FIG. 2 is a block diagram of a semiconductor device according to some embodiments of the present disclosure.

FIG. 2 is a block diagram of a semiconductor device according to some embodiments of the present disclosure. The apparatus may be a semiconductor device 200, and will be referred as such. In some embodiments, the semiconductor device 200 may include, without limitation, a dynamic random access (DRAM) device integrated into a single semiconductor chip. In some examples, the DRAM may be a double data rate (DDR) memory. In some embodiments, one or all of the memory devices 104(0-7) may include semiconductor device 200.

The semiconductor device 200 includes a memory die. The die may be mounted on an external substrate, for example, a memory module substrate, a mother board or the like (e.g., package-on-package (POP)). The semiconductor device 200 may further include a memory array 250. The memory array 250 includes a plurality of banks BANK0-15, each bank including a plurality of word lines WL, a plurality of bit lines BL, and a plurality of memory cells MC arranged at intersections of the plurality of word lines WL and the plurality of bit lines BL. Although sixteen banks are shown in FIG. 2, memory array 250 may include any number of banks. The selection of the word line WL is performed by a row decoder 240 and the selection of the bit line BL is performed by a column decoder 245. Sense amplifiers (SAMP) are located for their corresponding bit lines BL and connected to at least one respective local I/O line pair (LIOT/B), which is in turn coupled to at least respective one main I/O line pair (MIOT/B), via transfer gates (TG), which function as switches. The TG may be coupled to one or more read/write amplifiers (RWAMP) 255, which may be coupled to an error correction code (ECC) circuit 235. The ECC circuit 235 may be coupled to an IO circuit 260, which may be coupled to one or more external terminals of semiconductor device 200. Read data from the bit line BL is amplified by the sense amplifier SAMP, and transferred to read/write amplifiers 255 over complementary local data lines (LIOT/B), transfer gate (TG), and complementary main data lines (MIOT/B) to the ECC circuit 235. Conversely, write data outputted from the ECC circuit 235 is transferred to the sense amplifier SAMP over the complementary main data lines MIOT/B, the transfer gate TG, and the complementary local data lines LIOT/B, and written in the memory cell MC coupled to the bit line BL.

The semiconductor device 200 may employ a plurality of external terminals that include command and address terminals coupled to a command/address (C/A) bus to receive command and address signals, clock terminals to receive clock signals CK_t and CK_c, data terminals DQ, RDQS, and power supply terminals VDD, VSS, VDDQ, and VSSQ.

The C/A terminals may be supplied with an address and a bank address signal from outside, for example, from a controller 202. The address signal and the bank address signal supplied to the address terminals are transferred, via a command/address input circuit 205, to an address decoder 212. The address decoder 212 receives the address signals and supplies a decoded row address signal XADD to the row decoder 240, and a decoded column address signal YADD to the column decoder 245. The address decoder 212 also receives the bank address signal BADD and supplies the bank address signal to the row decoder 240 and the column decoder 245.

The C/A terminals may further be supplied with command signals from, for example, a controller 202. In some embodiments, controller 202 may be implemented or included in controller 106. The command signals may be provided as internal command signals ICMD to a command decoder 215 via the command/address input circuit 205. The command decoder 215 includes circuits to decode the internal command signals ICMD to generate various internal signals and commands for performing operations, for example, a row activation signal (ACT) to select a word line and a column activation signal (C_ACT) to select one or more bit lines. Another example may be providing internal signals to enable circuits for performing operations, such as control signals to enable signal input buffers that receive clock signals.

In some embodiments, the columns (e.g., bit lines) of each bank BANK0-15 may be organized into multiple column planes, where each column plane includes one or more columns (e.g., 64, 128, 256, 512). Each column plane may be associated with one or more multiple column selects (e.g., CS0-63). In some embodiments, the column selects CS may be provided by the column decoder 245. The column decoder 245 may activate the column selects CS responsive to the column address (YADD), bank address BADD, and/or column activation signal C_ACT. Each column select may activate one or more columns of a column plane (e.g., eight bit lines may be activated in a column plane responsive to an active column select). According to embodiments of the present disclosure, a portion of one or all of the column planes may be used to store metadata. For example, a portion of each column plane associated with one or more column selects (e.g., CS 60-63, CS 56-63) may be used to store metadata. The remaining portions of the column planes (e.g., CS 0-59, CS 0-55) may be used to store data associated with the metadata.

The C/A terminals may receive an access command which is a read command. When a read command is received, and a bank address, a row address and a column address are timely supplied with the read command, a code word including read data, metadata, and read ECC data (e.g., parity bits) is read from memory cells in the memory array 250 corresponding to the row address and column address. The read command is received by the command decoder 215, which provides internal commands so that read data from the memory array 250 is provided to the ECC circuit 235. The ECC circuit 235 may use the parity bits in the code word to determine if the code word includes any errors, and if any errors are detected, may correct them to generate a corrected code word (e.g., by changing a state of the identified bit(s) which are in error). The corrected code word (without the parity bits) is output from the data terminals DQ via the input/output circuit 260.

The C/A terminals may receive an access command which is a write command. When the write command is received, and a bank address, a row address, and a column address are timely supplied as part of the write operation, and write data is supplied through the DQ terminals to the ECC circuit 235. The ECC circuit 235 may generate a code word including the data, metadata, and ECC data and provide the code word to the memory array 260 via the RWAMP 255. The write data (which may include write data, ECC data metadata) supplied to the data terminals DQ is written to a memory cells in the memory array 250 corresponding to the row address and column address. The write command is received by the command decoder 215, which provides internal commands so that the write data is received by data receivers in the input/output circuit 260. The write data is supplied via the input/output circuit 260 to the ECC circuit 235. The ECC circuit 235 may generate ECC data (e.g., a number of parity bits) based on the write data, and the write data and the parity bits may be provided as a code word to the memory array 250 to be written into the memory cells MC.

The ECC circuit 235 may be used to ensure the fidelity of the data read from a particular group of memory cells to the data written to that group of memory cells. The semiconductor device 200 may include a number of different ECC circuits 235, each of which is responsible for a different portion of the memory cells MC of the memory array 250. For example, there may be one or more ECC circuits 235 for each bank of the memory array 250. Typically, each bank BANK0-15 includes a column plane for the storage of ECC data (e.g., parity bits) and additional column planes for the storage of data (e.g., sixteen column planes). In these applications, the ECC circuit 235 generates eight bits of ECC data (e.g., 8 bits of ECC data) for each prefetch of 128 bits and metadata (e.g., 8 bits, 16 bits). This may allow for the ECC circuit 235 to provide single bit error correction. Generation of ECC data, checking for errors, detection of errors, and correction of errors may collectively be referred to as ECC operations.

According to embodiments of the present disclosure, the data, ECC data, and the metadata may be provided to the ECC circuit 235 along with the ECC data. The ECC circuit 235 may analyze the data, metadata, and ECC data as a combined code word to check for and correct errors in the data and the metadata. The metadata and data (or, if necessary, the corrected data and metadata) may be provided from the ECC circuit 235 to the IO circuit 260 for read operations, and a code word including the metadata, data, and ECC data may be generated by the ECC circuit 235 and provided to the memory array 250 for write operations.

In some embodiments, the data and the metadata may be accessed by a "two-pass" method. For example, during a read operation, the metadata may be accessed in a first pass by activating the column select associated with the metadata in a plane, and the data may be accessed in a second pass by activating the column select associated with the data in all of the planes. In some embodiments, the ECC data associated with the data and the metadata may be accessed during the first pass or the second pass by activating the column select associated with the ECC data in the ECC plane. In some embodiments, the metadata may be stored in the array 250 and/or a buffer outside the array (not shown) while the data is accessed. This may reduce storage needs in embodiments where there is less metadata than data. The metadata and data may be concatenated prior to being output by the semiconductor device 200. For example, the metadata may be appended to the front or the back of the data (e.g., it is output first or last from the semiconductor device 200, respectively). In some embodiments, the write data may be provided to the memory array 250 in two passes. In a first pass, the data may be written to the memory array 250, and the metadata may be stored in a buffer. In a second pass, the metadata may be written to the memory array 250. In some embodiments the ECC data may be written in the first pass or the second pass.

The command decoder 215 may access mode register 275 that is programmed with information for setting various modes and features of operation for the semiconductor device 200. For example, the mode register 275 may provide parameters that allow the semiconductor device 200 to operate at different frequencies, provide different burst lengths, allow banks BANK0-15 to be organized into different groups, operate in ×4, ×8, or ×16 mode, and/or other different operating conditions. In some embodiments, mode register 275 may include multiple registers.

The information in the mode register 275 may be programmed by providing the semiconductor device 200 a mode register write command, which causes the semiconductor device 200 to perform a mode register write operation. In some embodiments, data to be written to the mode register 275 is provided via the C/A terminals and/or the DQ terminals. The command decoder 215 accesses the mode register 275, and based on the programmed information along with the internal command signals provides the internal signals to control the circuits of the semiconductor device 200 accordingly. Information programmed in the mode register 275 may be externally provided by the semiconductor device 200 using a mode register read command, which causes the semiconductor device 200 to access the mode register 275 and provide the programmed information (e.g., to the memory controller 202). In some embodiments, the information may be provided via the C/A terminals and/or the DQ terminals.

Turning to the explanation of the external terminals included in the semiconductor device 200, the clock terminals and data clock terminals are supplied with external clock signals and complementary external clock signals. The external clock signals CK_t, CK_c may be supplied to a clock input circuit 220. When enabled, input buffers included in the clock input circuit 220 pass the external clock signals. For example, an input buffer passes the CK_t and CK_c signals when enabled by a CKE signal from the command decoder 215. The clock input circuit 220 may use the external clock signals passed by the enabled input buffers to generate internal clock signal ICK. The internal clock signal ICK are supplied to internal clock circuit 230 for providing one or more clock signals to the various components of semiconductor device 200.

The internal clock circuits 230 includes circuits that provide various phase and frequency controlled internal clock signals based on the received internal clock signals. For example, the internal clock circuits 230 may include a clock path (not shown in FIG. 2) that receives the ICK clock signal and provides internal clock signals ICK and ICKD to the command decoder 215. Optionally, the input/output circuit 260 may include clock circuits and driver circuits for generating and providing the RDQS signal to a controller.

The power supply terminals are supplied with power supply potentials VDD and VSS. These power supply potentials VDD and VSS are supplied to an internal voltage generator circuit 270. The internal voltage generator circuit 270 generates various internal potentials VPP, VOD, VARY, VPERI, and the like and a reference potential ZQVREF based on the power supply potentials VDD and VSS. The internal potential VPP is mainly used in the row decoder 240, the internal potentials VOD and VARY are mainly used in the sense amplifiers included in the memory array 250, and the internal potential VPERI is used in many other circuit blocks.

The power supply terminal is also supplied with power supply potential VDDQ. The power supply potentials VDDQ is supplied to the input/output circuit 260 together with the power supply potential VSS. The power supply potential VDDQ may be the same potential as the power supply potential VDD in an embodiment of the disclosure. The power supply potential VDDQ may be a different potential from the power supply potential VDD in another embodiment of the disclosure. However, the dedicated power supply potential VDDQ is used for the input/output circuit 260 so that power supply noise generated by the input/output circuit 260 does not propagate to the other circuit blocks.

Figure 3:
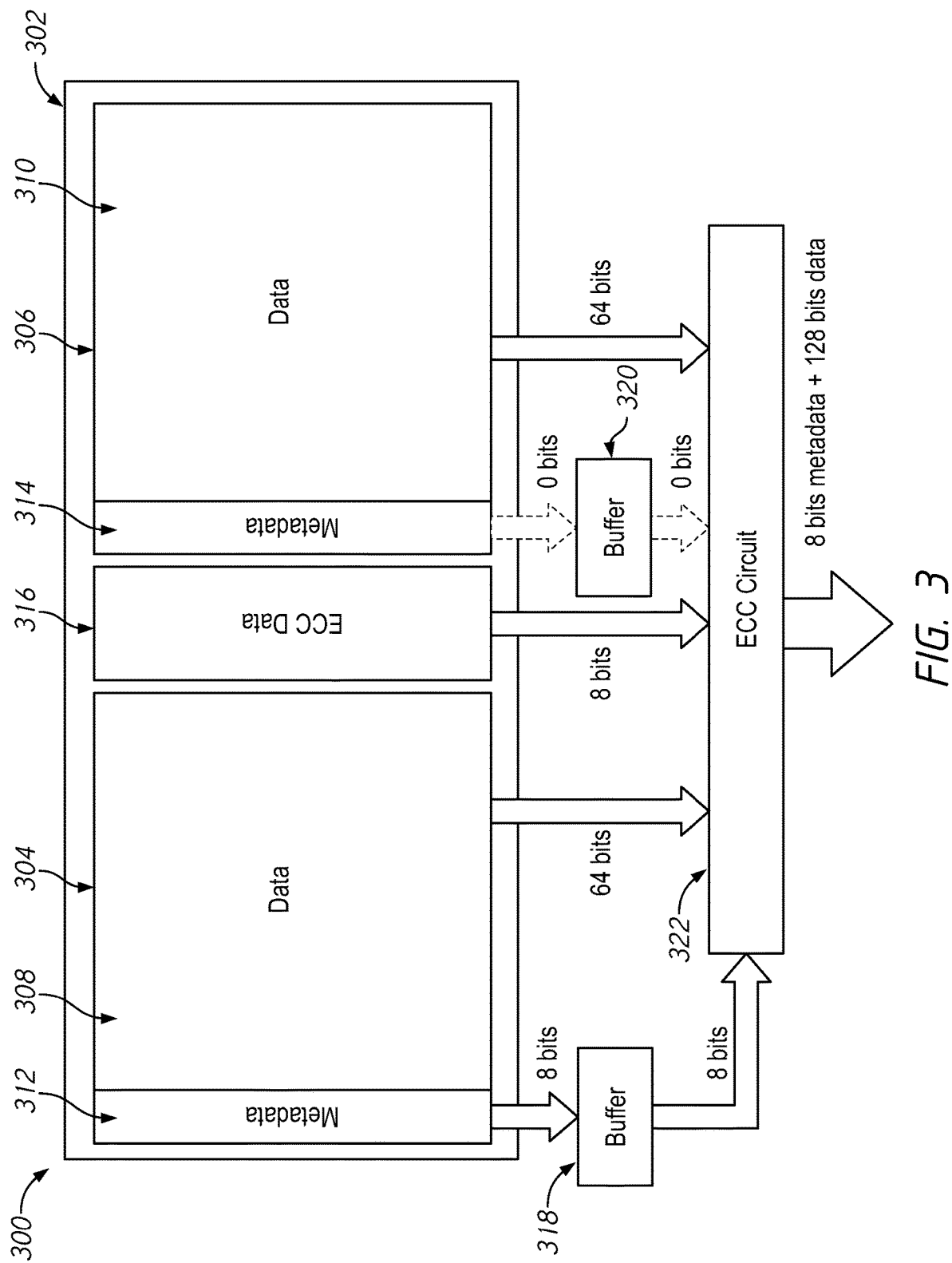
FIG. 3 is a block diagram showing an example of a read operation of a memory according to some example embodiments of the present disclosure.

FIG. 3 is a block diagram showing an example of a read operation of a memory according to some example embodiments of the present disclosure. In the example shown in FIG. 3, 8 bits of metadata are provided for a prefetch. FIG. 3 shows a view of a portion of a memory device 300. In some embodiments, memory device 300 may be included in device 200 and/or one or more of memory devices 104(0-7). Memory device 300 shows a representation of what portions of a portion of a memory array 302 are set aside for different types of information. In some embodiments, the portion of memory array 302 shown in FIG. 3 may represent at least a portion of a bank of the memory array 302 (e.g., one of BANK0-15 shown in FIG. 2). The blocks shown in FIG. 3 represent portions of a memory array 302, but do not necessarily represent a spatial layout of where information is stored in the memory array 302. Further, the relative sizes of the blocks may not be representative of actual relative sizes of the different portions of the memory array 302.

FIG. 3 is described with respect to an example embodiment where there are 16 data column planes 304, 306, where each column plane provides 8 bits when activated by a column select signal. The column planes 304, 306 include data portions 308, 310 that store data and metadata portions 312, 314 that store metadata. The memory array 302 may include an ECC data column plane 316 for storing ECC data which also provides 8 bits when activated by a column select. The memory device 300 may be operated in a ×8 mode where 128 data bits, 8 ECC data bits, and 8 metadata bits are accessed by a controller (e.g., controller 106, controller 202).

During an example two-pass read operation, in a first pass, a column select (e.g., one of CS 60-63) for a column plane may be activated to access 8 bits of metadata. In the example shown in FIG. 3, 8 bits of metadata are accessed from metadata portion 312 of a column of column planes 304. However, depending on the column address (CA), the 8 bits of metadata could have been accessed from the metadata portion 314 in another example. The 8 bits of metadata may be provided from memory array 302 to a buffer 318. The buffer 318 may be implemented by one or more latches, flip-flops, and/or other circuit capable of storing the metadata bits. In examples where metadata is accessed from metadata portion 314, the metadata bits may be provided from memory array 302 and stored in buffer 320. In some embodiments, buffer 320 may be omitted, and metadata bits from metadata portion 314 may also be provided to buffer 318. In some embodiments, the buffers 318, 320 may be local to a bank of the memory array 302. That is, each bank may include its own buffers for storing metadata in some embodiments. In other embodiments, buffers may be shared between two or more banks.

In a second pass, a column select (e.g., one of CS 0-59) for all of the column planes 304, 306 is activated to access 128 bits of data and a column select for the ECC data column plane 316 may be activated to access 8 bits of ECC data. In some embodiments, the data and the ECC data may be retrieved concurrently (e.g., at the same time or substantially at the same time). The 128 bits of data and 8 bits of ECC data may be provided from the memory array 302 to ECC circuit 322. The 8 bits of metadata may be provided from buffer 318 to the ECC circuit 322. In examples where metadata was provided to buffer 320, the metadata would be provided to the ECC circuit 322 from buffer 320 instead of buffer 318. In some embodiments, ECC circuit 322 may be included in ECC circuit 235. The ECC circuit 322 may perform error detection and correction operations on the data, metadata, and ECC data. In some embodiments, the data, ECC data, and metadata may be combined as a single code word. The ECC circuit 322 may then output the 128 bits of data and 8 bits of metadata (corrected, if applicable). In some embodiments, the data and metadata output by the ECC circuit 322 may be provided to an IO circuit, such as IO circuit 260. The data and metadata may be concatenated and provided to the controller (e.g., via DQ pins). In some embodiments, the metadata may be attached to the end of the data such that the controller receives the data bits followed by the metadata bits.

During an example two-pass write operation, 128 data bits and 8 metadata bits may be provided to the ECC circuit 322. The data and metadata bits may be provided from the IO circuit. The ECC circuit 322 may generate a code word based on the data bits and the metadata bits and produce 8 bits of metadata, 128 bits of data, and 8 bits of ECC data. The metadata bits may be provided to buffer 318 in some examples or buffer 320 in other examples. In a first pass, a column select in all of the column planes 304, 306 may be activated, and the 128 bits of data may be written to the memory array 302. A column select in the ECC data column plane 316 may be activated, and the 8 bits of ECC data may be written to the memory array 302. In some embodiments, the data and the ECC data may be written to the memory array concurrently. In a second pass, a column select in a column plane of column planes 304 in some examples or a column select in a column plane of column planes 306 may be activated, and the 8 bits of metadata may be provided from the buffer 318 and written to the memory array 302 (e.g., written to metadata portion 312).

In some embodiments, since only 8 bits of metadata are accessed, and all 8 bits of metadata are used, a read-modify-write operation may not be necessary. This may reduce a time penalty incurred by one or more types of two-pass access operations of the memory array.

Figure 4:
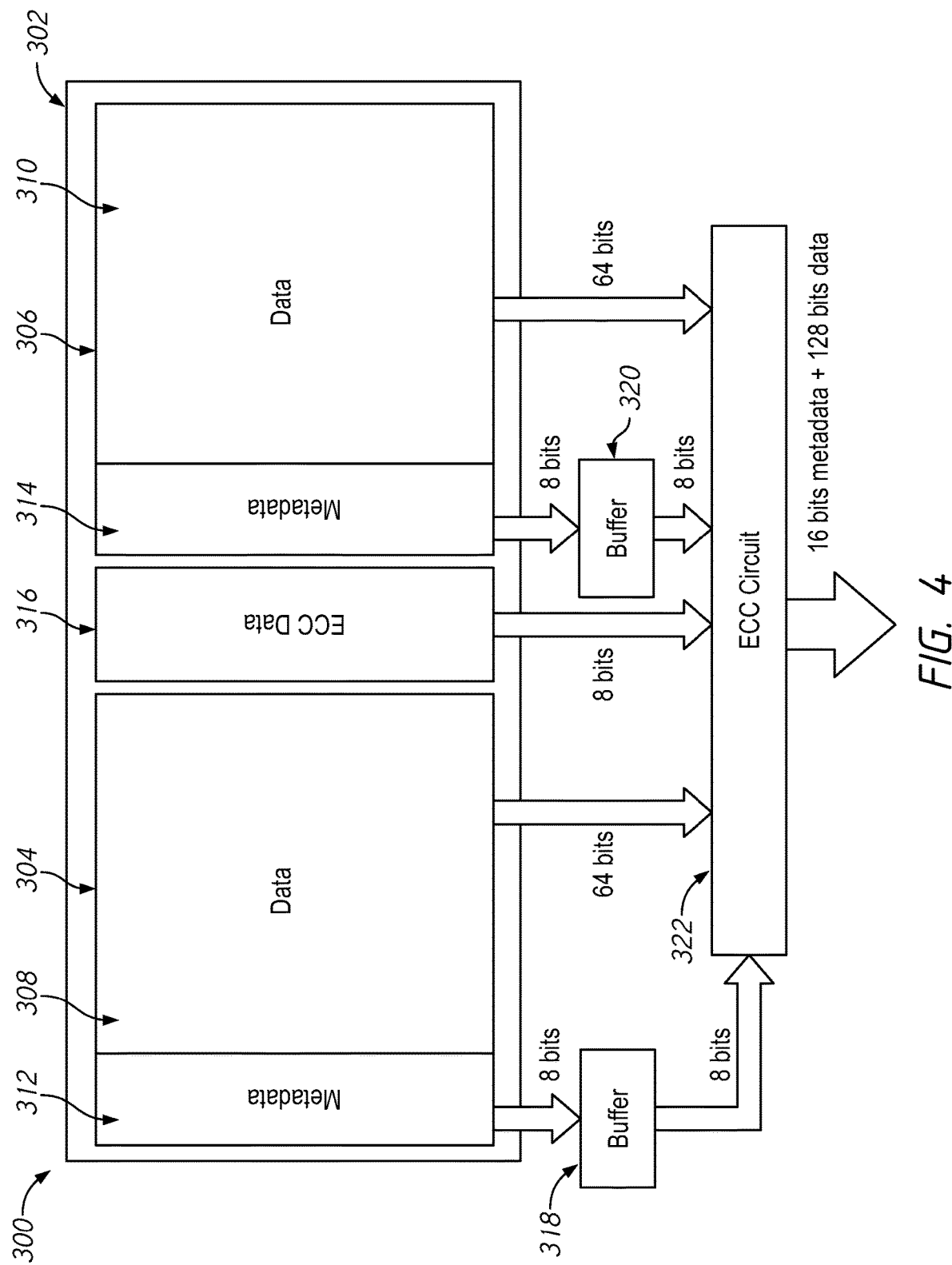
FIG. 4 is a block diagram showing an example of a read operation of a memory according to some example embodiments of the present disclosure.

FIG. 4 is a block diagram showing an example of a read operation of a memory according to some example embodiments of the present disclosure. In the example shown in FIG. 4, 16 bits of metadata are provided for a prefetch. FIG. 4 shows a view of the portion of the memory device 300 shown in FIG. 3. However, in the example shown in FIG. 4, the metadata portions 312, 314 of the column planes 304, 306 are larger. However, the blocks shown in FIG. 4 may not necessarily represent a spatial layout of where information is stored in the memory array 302, and the relative sizes of the blocks may not be representative of actual relative sizes of the different portions of the memory array 302.

The memory device 300 may be operated in a ×8 mode where 128 data bits, 8 ECC data bits, and 16 metadata bits are accessed by a controller (e.g., controller 106, controller 202).

During an example two-pass read operation, in a first pass, a column select (e.g., one of CS 56-63) a column plane and a column select for another column plane may be activated to access 16 bits of metadata. In some embodiments, a same column select for both planes may be activated. In the example shown in FIG. 4, 8 bits of metadata are accessed from metadata portion 312 of a column of column planes 304 and 8 bits of metadata are accessed from the metadata portion 314. The 8 bits of metadata from metadata portion 312 may be provided from the memory array 302 to a buffer 318 and the 8 bits of metadata from metadata portion 314 may be provided to buffer 320. However, in some embodiments, the metadata from both metadata portions 312, 314 may be provided to a same buffer.

In a second pass, a column select (e.g., one of CS 0-55) for all of the column planes 304, 306 is activated to access 128 bits of data and a column select for the ECC data column plane 316 may be activated to access 8 bits of ECC data. In some embodiments, the data and the ECC data may be retrieved concurrently. The 128 bits of data and 8 bits of ECC data may be provided from the memory array 302 to ECC circuit 322. The 16 bits of metadata may be provided from buffer 318 and buffer 320 (each buffer providing 8 bits of metadata) to the ECC circuit 322. The ECC circuit 322 may perform error detection and correction operations on the data, metadata, and ECC data. In some embodiments, the data, ECC data, and metadata may be combined as a single code word. The ECC circuit 322 may then output the 128 bits of data and 16 bits of metadata (corrected, if applicable). In some embodiments, the data and metadata output by the ECC circuit 322 may be provided to the IO circuit. The data and metadata may be concatenated and provided to the controller (e.g., via DQ pins). In some embodiments, the metadata may be attached to the end of the data such that the controller receives the data bits followed by the metadata bits.

During an example two-pass write operation, 128 data bits and 16 metadata bits may be provided to the ECC circuit 322. The data and metadata bits may be provided from the IO circuit. The ECC circuit 322 may generate a code word based on the data bits and the metadata bits and produce 16 bits of metadata, 128 bits of data, and 8 bits of ECC data. The metadata bits may be provided to buffers 318 and 320. Each buffer may receive 8 bits of metadata in some examples. In a first pass, a column select in all of the column planes 304, 306 may be activated, and the 128 bits of data may be written to the memory array 302. A column select in the ECC data column plane 316 may be activated, and the 8 bits of ECC data may be written to the memory array 302. In some embodiments, the data and the ECC data may be written to the memory array concurrently. In a second pass, a column select in a column plane of column planes 304 and a column select in a column plane of column planes 306 may be activated in some examples, and the 16 bits of metadata may be provided from buffers 318 and 320 and may be written to the memory array 302 (e.g., to metadata portions 312 and 314).

In some embodiments, since only 8 bits of metadata are accessed in each column plane (e.g., two planes), and all 8 bits of metadata are used from each plane, a read-modify-write operation may not be necessary. This may reduce a time penalty incurred by one or more types of two-pass access operations of the memory array.

Figure 5:
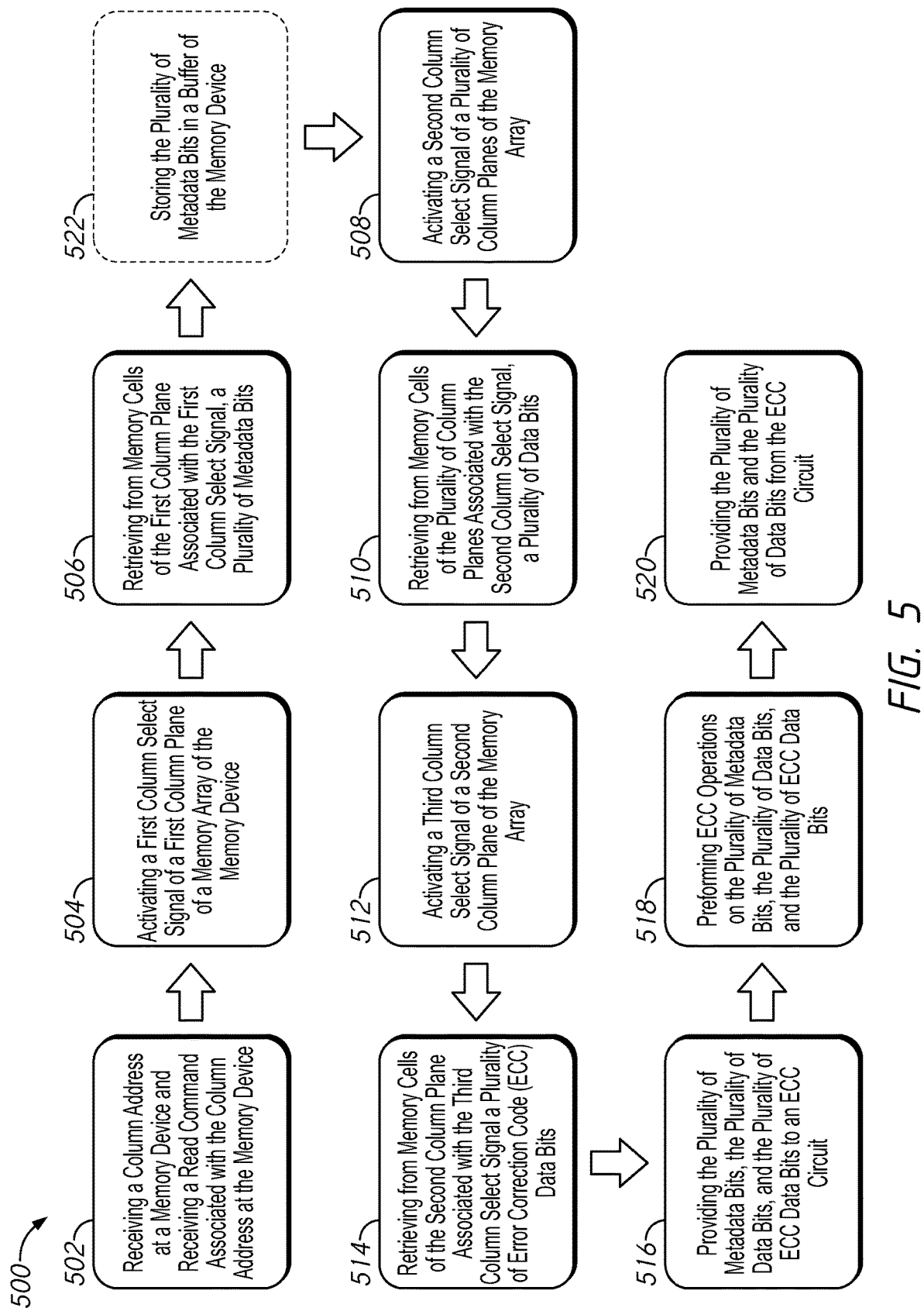
FIG. 5 is a flow chart of a method according to some embodiments of the present disclosure.

FIG. 5 is a flow chart of a method according to some embodiments of the present disclosure. The method shown in flow chart 500 may be implemented in whole or in part by the memory device(s) 104, device 200, and/or memory device 300 in some embodiments.

At block 502, "receiving a column address at a memory device and receiving a read command associated with the column address at the memory device" may be performed. In some embodiments, the column address and/or read command may be provided by a controller, such as controller 106 and/or controller 202.

At block 504, "activating a first column select signal of a first column plane of a memory array of the memory device" may be performed. In some embodiments, the first column select signal and the first column plane is based, at least in part, on the column address. In some embodiments, the column select signal may be activated by a column decoder, such as column decoder 245.

At block 506, "retrieving from memory cells of the first column plane associated with the first column select signal, a plurality of metadata bits" may be performed. The memory cells may be located in a portion of a column plane configured to store data and metadata in some embodiments. In some embodiments, the method may further include storing the plurality of metadata bits in a buffer of the memory device, such as buffer 318 and/or 320 as indicated by block 522.

At block 508, "activating a second column select signal of a plurality of column planes of the memory array" may be performed. In some embodiments, the second column select signal is based, at least in part, on the column address.

At block 510, "retrieving from memory cells of the plurality of column planes associated with the second column select signal, a plurality of data bits" may be performed.

At block 512, "activating a third column select signal of a second column plane of the memory array" may be performed. The third column select may be a same column select as the second column select in embodiments where a same column select value is used for both the ECC plane and the data plane.

At block 514, "retrieving from memory cells of the second column plane associated with the third column select signal a plurality of error correction code (ECC) data bits" may be performed. In some embodiments, the plurality of metadata bits is retrieved from the memory array prior to retrieving the plurality of data bits from the memory array. In some embodiments, the data and ECC data may be retrieved concurrently.

In some embodiments, the method shown in flow chart 500 may further include "providing the plurality of metadata bits, the plurality of data bits, and the plurality of ECC data bits to an ECC circuit" as shown by block 516. In some embodiments ECC circuit may include ECC circuit 235 and/or ECC circuit 322. In some embodiments, the plurality of data bits and the plurality of ECC data bits are provided from the memory array to the ECC circuit and the plurality of metadata bits are provided from a buffer to the ECC circuit.

At block 518, "performing ECC operations on the plurality of metadata bits, the plurality of data bits, and the plurality of ECC data bits" may be performed. In some embodiments, performing ECC operations may include correcting an error in the plurality of metadata bits, the plurality of data bits, or the plurality of ECC data bits.

At block 520 "providing the plurality of metadata bits and the plurality of data bits from the ECC circuit" may be performed. In some embodiments, the data and metadata may be provided to an IO circuit, such as IO circuit 260.

In some embodiments, such as in the example shown in FIG. 4, metadata may be retrieved from two different column planes of the memory array. In these embodiments, the method shown in flow chart 500 may further include activating a fourth column select signal of a third column plane of the memory array of the memory device and retrieving from memory cells of the third column plane associated with the fourth column select signal, a second plurality of metadata bits. In some embodiments, the fourth column select signal and the first column select signal may be the same. In these embodiments, the method shown in flow chart 500 may further include providing the plurality of metadata bits, the second plurality of metadata bits, the plurality of data bits, and the plurality of ECC data bits to an ECC circuit, performing ECC operations on the plurality of metadata bits, the second plurality of metadata bits, the plurality of data bits, and the plurality of ECC data bits, wherein performing ECC operations comprises correcting an error in the plurality of metadata bits, the plurality of data bits, or the plurality of ECC data bits, and providing the plurality of metadata bits, the second plurality of metadata bits, and the plurality of data bits from the ECC circuit.

Figure 6:
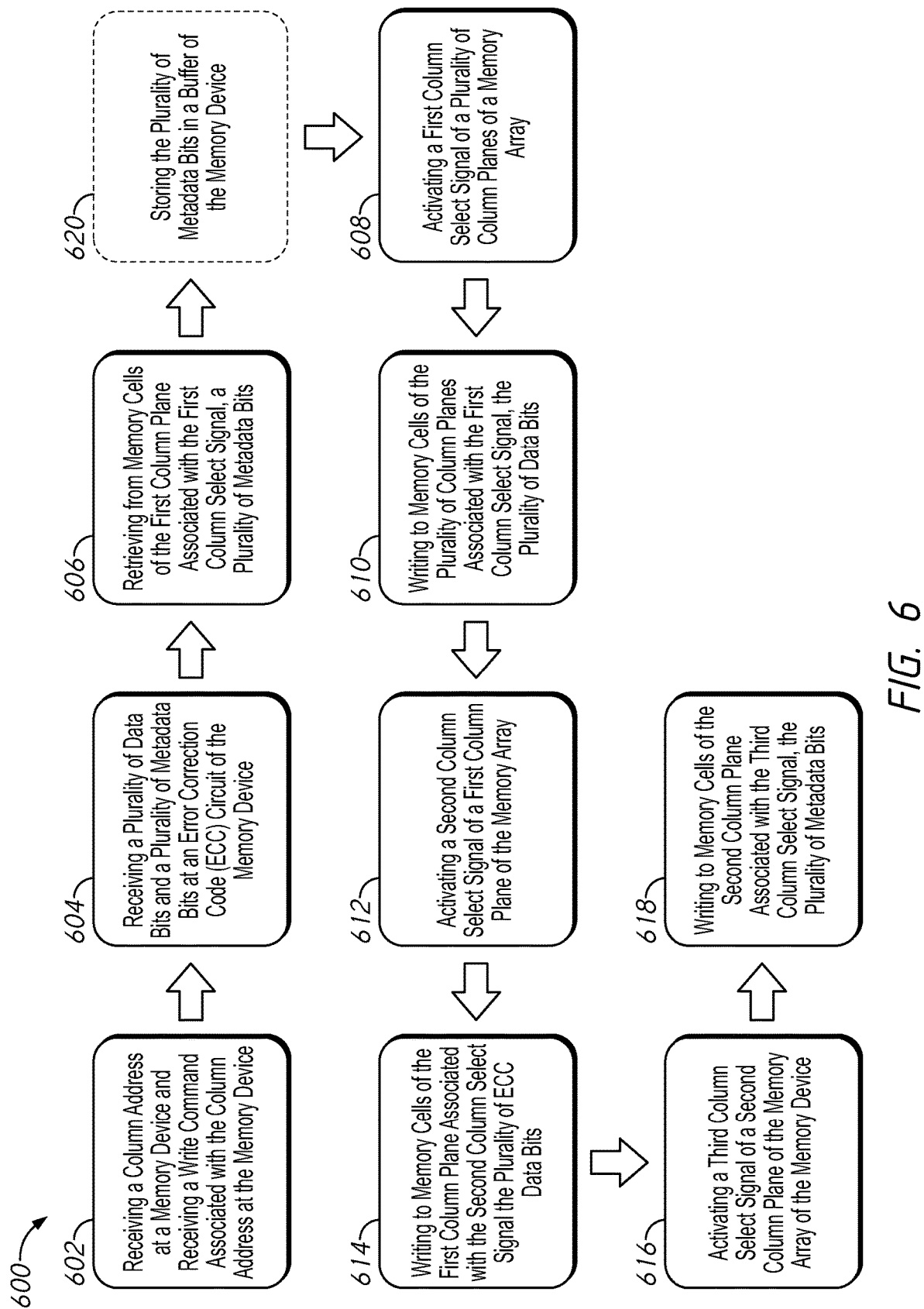
FIG. 6 is a flow chart of a method according to some embodiments of the present disclosure.

FIG. 6 is a flow chart of a method according to some embodiments of the present disclosure. The method shown in flow chart 600 may be implemented in whole or in part by the memory device(s) 104, device 200, and/or memory device 300 in some embodiments.

At block 602, "receiving a column address at a memory device and receiving a write command associated with the column address at the memory device" may be performed. In some embodiments, the column address and/or read command may be provided by a controller, such as controller 106 and/or controller 202.

At block 604, "receiving a plurality of data bits and a plurality of metadata bits at an error correction code (ECC) circuit of the memory device" may be performed.

At block 606, "generating, with the ECC circuit, ECC data bits based, at least in part, on the plurality of data bits and the plurality of metadata bits" may be performed.

At block 608, "activating a first column select signal of a plurality of column planes of a memory array" may be performed. In some embodiments, the first column select signal is based, at least in part, on the column address.

At block 610, "writing to memory cells of the plurality of column planes associated with the first column select signal, the plurality of data bits" may be performed.

At block 612, "activating a second column select signal of a first column plane of the memory array" may be performed. In some embodiments, the first column select signal and the second column select signal may be the same where a same column select value is used for both the ECC plane and the data plane.

At block 614, "writing to memory cells of the first column plane associated with the second column select signal the plurality of ECC data bits" may be performed.

At block 616 "activating a third column select signal of a second column plane of the memory array of the memory device" may be performed. In some embodiments, the third column select signal and the second column plane is based, at least in part, on the column address. In some embodiments, activating the third column select signal further comprises activating a third column plane of the memory array of the memory device.

At block 618, "writing to memory cells of the second column plane associated with the third column select signal, the plurality of metadata bits" may be performed. In some embodiments, writing the plurality of metadata bits comprises writing a portion of the plurality of metadata bits to memory cells of the third column plane associated with the third column select signal Optionally, at block 620 "storing the plurality of metadata bits in a buffer of the memory device" may be performed prior to block 608, block 610, block 612, block 614, block 616 and/or block 618. In some embodiments, the plurality of data bits are written to the memory array before the plurality of metadata bits are written to the memory array. In some embodiments, the plurality of ECC data bits are written to the memory array concurrently with writing the plurality of data bits to the memory array.

In some embodiments, the first, second, and third column selects are included in a plurality of sixty-four column selects, and the first column plane, the second column plane, and the plurality of column planes are included in a plurality of seventeen column planes, wherein four column selects or eight column selects of the plurality of sixty-four column selects are associated with memory cells configured to store the plurality of metadata bits.

The apparatuses, systems, and methods disclosed herein may allow for efficient access and error protection of metadata. In some applications, combining the data and the metadata into a single code word for ECC operations may reduce the need for read-modify-write operations during a pass of a multi-pass memory access operation when metadata is retrieved from the memory array.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
 a memory device comprising:
  a memory array comprising:
   a plurality of column planes, wherein a first portion of individual ones of the plurality of planes are configured to store metadata and a second portions of individual ones of the plurality of planes are configured to store data; and
   an additional column plane configured to store ECC data,
   wherein the metadata, the ECC data are associated with the data associated with the second portions of the individual ones of the plurality of column planes; and
  an error correction code (ECC) circuit configured to receive and perform ECC operations on the metadata, the data, the ECC data, or a combination thereof.

2. The apparatus of claim 1, further comprising a buffer configured to receive the metadata from the memory array and provide the metadata to the ECC circuit.

3. The apparatus of claim 1, wherein each of the plurality of column planes receives a plurality of column select signals.

4. The apparatus of claim 3, wherein a first portion of the plurality of column select signals are configured to activate the first portions of the individual ones of the plurality of column planes configured to store the metadata and a second portion of the plurality of column select signals are configured to activate the second portions of the individual ones of the plurality of column planes configured to store the data, wherein the first portion of the plurality of column select signals and the second portion of the plurality of column select signals are mutually exclusive.

5. The apparatus of claim 4, wherein the first portion of the plurality of column select signals comprises four column select signals and the second portion of the plurality of column select signals comprises sixty column select signals; or the first portion of the plurality of column select signals comprises eight column select signals and the second portion of the plurality of column select signals comprises fifty-six column select signals.

6. The apparatus of claim 1, wherein the ECC circuit receives eight bits of metadata or sixteen bits of metadata.

7. A method comprising:
receiving a column address at a memory device;
receiving a read command associated with the column address at the memory device;
activating a first column select signal of a first column plane of a memory array of the memory device, wherein the first column select signal and the first column plane is based, at least in part, on the column address;
retrieving from memory cells of the first column plane associated with the first column select signal, a plurality of metadata bits;
activating a second column select signal of a plurality of column planes of the memory array, wherein the second column select signal is based, at least in part, on the column address;
retrieving from memory cells of the plurality of column planes associated with the second column select signal, a plurality of data bits;
activating a third column select signal of a second column plane of the memory array; and
retrieving from memory cells of the second column plane associated with the third column select signal a plurality of error correction code (ECC) data bits.

8. The method of claim 7, further comprising storing the plurality of metadata bits in a buffer of the memory device.

9. The method of claim 7, further comprising:
providing the plurality of metadata bits, the plurality of data bits, and the plurality of ECC data bits to an ECC circuit;
performing ECC operations on the plurality of metadata bits, the plurality of data bits, and the plurality of ECC data bits, wherein performing the ECC operations comprises correcting an error in the plurality of metadata bits, the plurality of data bits, or the plurality of ECC data bits; and
providing the plurality of metadata bits and the plurality of data bits from the ECC circuit, wherein at least one of the plurality of metadata bits or the plurality of data bits is modified when the error is corrected.

10. The method of claim 9, wherein the plurality of data bits and the plurality of ECC data bits are provided from the memory array to the ECC circuit and the plurality of metadata bits are provided from a buffer to the ECC circuit.

11. A method comprising:
receiving a column address at a memory device;
receiving a read command associated with the column address at the memory device;
activating a first column select signal of a first column plane of a memory array of the memory device, wherein the first column select signal and the first column plane is based, at least in part, on the column address;
retrieving from memory cells of the first column plane associated with the first column select signal, a plurality of metadata bits;
activating a second column select signal of a plurality of column planes of the memory array, wherein the second column select signal is based, at least in part, on the column address;
retrieving from memory cells of the plurality of column planes associated with the second column select signal, a plurality of data bits;
activating a third column select signal of a second column plane of the memory array; and
retrieving from memory cells of the second column plane associated with the third column select signal a plurality of error correction code (ECC) data bits;
activating a fourth column select signal of a third column plane of the memory array of the memory device; and
retrieving from memory cells of the third column plane associated with the fourth column select signal, a second plurality of metadata bits.

12. The method of claim 11, wherein the fourth column select signal and the first column select signal are a same column select signal and the second column select signal and the third column select signal are a same column select signal.

13. The method of claim 11, further comprising:
providing the plurality of metadata bits, the second plurality of metadata bits, the plurality of data bits, and the plurality of ECC data bits to an ECC circuit;
performing ECC operations on the plurality of metadata bits, the second plurality of metadata bits, the plurality of data bits, and the plurality of ECC data bits, wherein performing ECC operations comprises correcting an error in the plurality of metadata bits, the plurality of data bits, or the plurality of ECC data bits; and
providing the plurality of metadata bits, the second plurality of metadata bits, and the plurality of data bits from the ECC circuit.

14. The method of claim 8, wherein the plurality of metadata bits is retrieved from the memory array prior to retrieving the plurality of data bits from the memory array.

15. A method comprising:
receiving a column address at a memory device,
receiving a write command associated with the column address at the memory device;
receiving a plurality of data bits and a plurality of metadata bits at an error correction code (ECC) circuit of the memory device;
generating, with the ECC circuit, a plurality of ECC data bits based, at least in part, on the plurality of data bits and the plurality of metadata bits;
activating a first column select signal of a plurality of column planes of a memory array, wherein the first column select signal is based, at least in part, on the column address;
writing to memory cells of the plurality of column planes associated with the first column select signal, the plurality of data bits;
activating a second column select signal of a first column plane of the memory array; and
writing to memory cells of the first column plane associated with the second column select signal the plurality of ECC data bits;
activating a third column select signal of a second column plane of the memory array of the memory device, wherein the third column select signal and the second column plane is based, at least in part, on the column address; and writing to memory cells of the second column plane associated with the third column select signal, the plurality of metadata bits.

16. The method of claim 15, further comprising storing the plurality of metadata bits in a buffer of the memory device.

17. The method of claim 15, wherein the plurality of data bits are written to the memory array before the plurality of metadata bits are written to the memory array.

18. The method of claim 15, wherein the first column select signal, the second column select signal, and the third column select signal are included in a plurality of sixty-four column select signals, and the first column plane, the second column plane, and the plurality of column planes are included in a plurality of seventeen column planes, wherein four column selects or eight column selects of the plurality of sixty-four column select signalss are associated with memory cells configured to store the plurality of metadata bits.

19. The method of claim 18, wherein activating the third column select signal further comprises activating a third column plane of the memory array of the memory device; and
wherein writing the plurality of metadata bits comprises writing a portion of the plurality of metadata bits to memory cells of the third column plane associated with the third column select signal.

20. The method of claim 15, wherein the plurality of ECC data bits are written to the memory array concurrently with writing the plurality of data bits to the memory array.

* * * * *